Dec. 16, 1924.
A. E. MURPHY
CAP FOR LIQUID AND PRESSURE TANKS
Filed Dec. 19, 1922
1,519,413
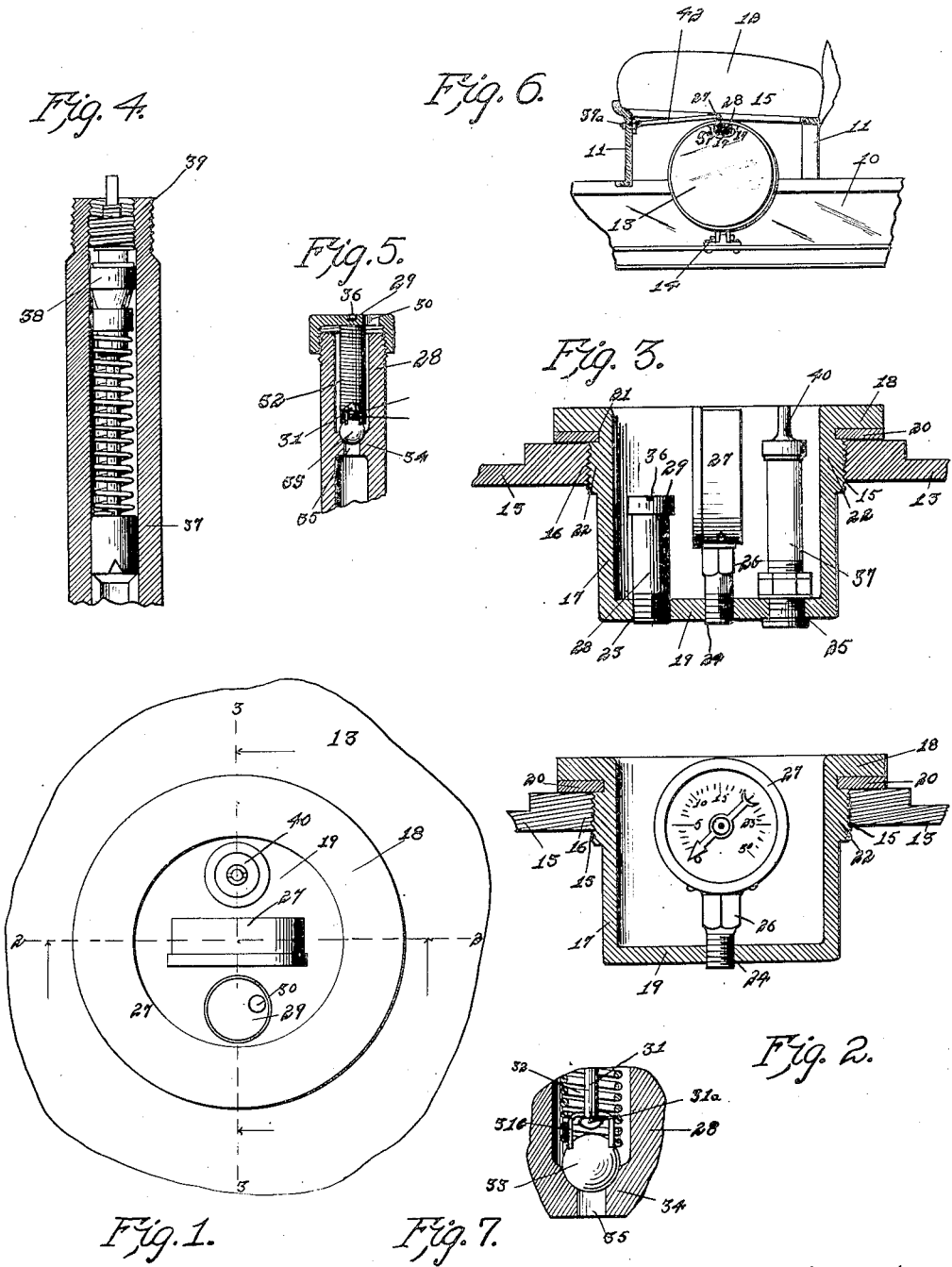

Patented Dec. 16, 1924.

1,519,413

UNITED STATES PATENT OFFICE.

ALFRED E. MURPHY, OF BOONE, IOWA.

CAP FOR LIQUID AND PRESSURE TANKS.

Application filed December 19, 1922. Serial No. 607,822.

*To all whom it may concern:*

Be it known that I, ALFRED E. MURPHY, a citizen of the United States, and a resident of Boone, in the county of Boone and State of Iowa, have invented a certain new and useful Improved Cap for Liquid and Pressure Tanks, of which the following is a specification.

This invention relates to improvements in caps for tanks of the type commonly used in automobiles, and particularly to that type of tanks which is used in the gravity system of fuel supply. The fuel tanks in these systems are usually so located that a difference of elevation is provided between the tank and the fuel consuming device such as the carburetor, and the said tanks are often so located that, if the automobile or vehicle carrying the tank is operated over an inclined surface, such as a steep hill, the elevation of the carburetor will be substantially that of the liquid within the tank, in which case the tank fails to supply the fuel to the carburetor, even if the tank is only partially empty. Other types of fuel feeding systems employ a small amount of air pressure in the tanks to overcome this difficulty, as the air pressure will feed the fuel to the carburetor even if the carburetor is above the fuel supply.

It is the object of my invention to provide an improved cap for that type of tanks using the gravity system, so arranged that the operator may, when the cap is placed in position within the regular tank supply opening, supply pressure to the tank whenever he desires by simply using an air pump which is a part of the regular automobile equipment, the said cap being so arranged that it may be placed in position in place of the regular cap, and constructed to contain the auxiliary devices necessary to convert the gravity system to a pressure system, the device being arranged in such a manner that it will rest normally within the tank, so as to not interfere with or engage the permanent parts of the automobile near the filling opening.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a top view of my improved cap showing the manner in which it is mounted in the filling opening of the tank, the said tank being shown in segment.

Figure 2 is a detail, transverse, sectional view taken on the line 2—2 of Figure 1.

Figure 3 is a detail, transverse, sectional view taken on the line 3—3 of Figure 1.

Figure 4 is an enlarged, detail, sectional view of the filling stem.

Figure 5 is an enlarged, detail, sectional view of the outlet stem.

Figure 6 is a sectional view of a portion of an automobile frame showing an end elevation of the tank mounted therein, a portion of the tank being broken away to show the manner in which my improved cap is mounted therein.

Figure 7 is an enlarged, detail view of the valve construction of the outlet stem.

The numeral 10 indicates the frame of an automobile and 11 the seat supports upon which a seat 12 is mounted. Beneath the seat 12 is a tank 13, which is of that type employed in the gravity feed systems used to feed liquid fuel to the carburetor. The tank 13 is mounted on brackets 14 secured to the main frame 10. The upper side of the tank is provided with an opening 15, the said opening being for the purpose of supplying fuel to the tank, and is provided with a screw threaded portion 16 designed to receive a cap, which is to be replaced by my improved cap which comprises a cylindrical member 17 having at one end a flanged portion 18, and the opposite end provided with an end member 19. The flanged end of the cylindrical member is open.

Adjacent to the inner face of the flange 18 I have provided a washer 20 mounted in an annular groove 21. Adjacent to the groove 21 I have provided a screw-threaded portion 22 designed to coact with the screw threaded portion 16 of the opening 15. In the bottom member 19 I have provided screw threaded openings 23, 24 and 25. The opening 24 is provided with a pipe 26, the upper end of which is operatively connected to a pressure gauge 27 of the type that is in common use. The said gauge is of such diameter that it will be entirely contained within the cylindrical member 17, and arranged centrally within the opening.

The opening 23 is provided with what I shall term an outlet stem 28 which extends upwardly and in front of the gauge 27. The outer end of the said stem is screw threaded and provided with a cap 29 having an opening 30. The inner face of the cap 30 is provided with a downwardly extending stem 31 designed to have a spring 32 wound about it, and one end of which is secured to the cap 29, and the other rests on the ball valve 33 to yieldingly hold it closed. The opposite end of the stem 31 is provided with an enlarged head member 31$^a$ which rests in a loop 31$^b$ in the upper face of the ball valve 33. The ball valve 33 is designed to rest on a seat 34 within the said stem, the said seat 34 having a communicating opening 35. The stem 31 is of such length that when the cap 29 is screwed down to its lower limit of movement, the head 31$^a$ will engage the ball 33, but if the cap is partially screwed on, then the head 31$^a$ will disengage the valve and permit the valve to open in case the air pressure within the tank is increased above a certain predetermined point, the air escaping around the spring 32 and through the opening 30.

By this arrangement it will be seen that the amount of pressure within the tank may be regulated by turning the cap 29, as the pressure of the spring 32 against the ball 31 will be increased or decreased respectively as the cap is screwed downwardly or outwardly. The stem 28 is made comparatively short so that the line of vision between the lower side of the dial of the pressure gauge and the edge of the opening in the flange 18 will not be obscured thereby. The top of the cap is provided with a groove 36 in which a screw driver may be placed for adjusting the cap.

For applying pressure to the tank I have provided a stem 37 which I shall term as the filling stem. This stem is mounted in the opening 25 and constructed similar to the valve stems of the type used on inner tubes of pneumatic tires, and commonly known as the Schrader valve. This stem 37 is provided with the regular valve 38 which is designed to permit air to enter the tank, but prevents it from leaving the tank. The top end of the valve stem 37 is provided with a screw threaded portion 39 to which the coupling member of an air pump hose may be connected whenever it is desired to apply pressure to the interior of the tank, the upper end of the stem being provided with a cap 40 of the usual construction. The stem 37 is of such length that the said stem and the cap 40 will all be contained entirely within the cylindrical portion of the cap, as clearly shown in Figure 3.

By operating the air pump, it will be seen that pressure may be applied to the interior of the tank, the amount of which is determined by the gauge 27, and this may be regulated by adjusting the cap 29 in such a manner that when the desired pressure has been reached, the spring 32 will permit the valve 33 to be elevated and any excessive air that may be pumped in the tank will escape through the opening 30 without injuring the tank or without applying too much pressure to the fuel within.

It is often desired to operate the tank of an automobile under the gravity system of feeding fuel to the carburetor when the automobile or similar vehicle is being operated in a comparatively level country. When this is desired, the cap 29 may be elevated, causing the ball 33 to be elevated from the seat 34. This will permit air to enter the tank through the openings 30 and 35, and avoid the flow of fuel from stopping due to a partial vacuum being created within the tank as the fuel is consumed.

In Figure 6 I have shown a slightly modified form in which a stem 37$^a$, similar to the stem 37, is mounted in the number 11, the inner end of which is provided with a flexible pipe 42 extending into the opening 25 of the member 19 so that the outer end of the stem 37$^a$ may be connected to the coupling of a pump for filling the tank with air without having to remove the seat 12.

By this arrangement it will be seen that I have provided a device in the nature of an attachment which may be easily and quickly applied to the filling opening of a tank, and when so applied, the said tank may be either used as a pressure tank or as a gravity feed tank.

In the specification and drawings, I have described and illustrated my improved cap applied to an automobile tank, but it is evident that the same may be applied to any form of a tank which is designed to carry pressure.

I claim as my invention:

1. A pressure device for tanks comprising a hollow cylindrical member having an outwardly extending annular flange at one end and a closed end portion at the opposite end, the said end portion being provided with a number of openings, one of which is provided with a pressure gauge of such dimensions as to be entirely within the cylindrical body, an inlet valve stem within one of said openings, an inlet valve within said stem, an outlet valve stem in the other one of said openings, a valve for said outlet stem, and means for adjusting the last said valve so it may be used either as an outlet or inlet valve.

2. A detachable cap for tanks and the like designed to be screwed into the filling opening of the tank, said cap being provided with a pressure gauge, an inlet stem, an outlet stem, an inlet valve within said inlet stem, a valve in said outlet stem, and means for adjusting the last said valve so it may be used as an inlet or outlet valve.

3. A detachable cap for tanks and the like designed to be screwed into the filling opening of the tank, said cap being provided with a pressure gauge and an inlet and outlet stem, an inlet valve within said inlet stem, a valve in said outlet stem, means for adjusting the last said valve so it may be used as an inlet or outlet valve, and the last said means including means for adjusting said valve so that it will automatically regulate the amount of pressure applied to a tank in which the cap is placed.

4. A pressure device for tanks comprising a hollow cylindrical member having an outwardly extending flange at one end, a resilient washer adjacent to the inner face of said flange, the cylindrical member being provided with a screw threaded portion adjacent to the inner face of said washer and having one end closed, the closed portion being provided with a pressure gauge within said cylindrical portion, an inlet valve stem also within said cylindrical portion, a cap for said valve stem, an inlet valve within said valve stem, an outlet valve stem within said cylindrical portion, a seat for said valve stem, a valve for said seat, a cap for the last said valve stem, said cap being provided with an inwardly extending stem, a spring about said stem, the inner end of the inwardly extending stem being designed to engage the last said valve to hold it to its seat when in one position of its movement, and designed to release the valve from its seat when in another position of its movement.

Des Moines, Iowa, November 27, 1922.

ALFRED E. MURPHY.